(12) United States Patent
Wang et al.

(10) Patent No.: US 12,143,979 B2
(45) Date of Patent: Nov. 12, 2024

(54) METHODS AND DEVICES FOR ENABLING GROUP TRANSMISSION IN COMMUNICATION NETWORKS

(71) Applicant: Telefonaktiebolaget LM Ericsson (publ), Stockholm (SE)

(72) Inventors: Min Wang, Luleå (SE); Jan Christoffersson, Luleå (SE); Mårten Ericson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 428 days.

(21) Appl. No.: 17/610,521

(22) PCT Filed: May 21, 2019

(86) PCT No.: PCT/EP2019/063140
§ 371 (c)(1),
(2) Date: Nov. 11, 2021

(87) PCT Pub. No.: WO2020/233804
PCT Pub. Date: Nov. 26, 2020

(65) Prior Publication Data
US 2022/0217731 A1 Jul. 7, 2022

(51) Int. Cl.
*H04W 74/08* (2024.01)
*H04W 72/121* (2023.01)
(Continued)

(52) U.S. Cl.
CPC ......... *H04W 72/121* (2013.01); *H04W 72/20* (2023.01); *H04W 72/23* (2023.01); *H04W 28/0278* (2013.01)

(58) Field of Classification Search
CPC ............... H04W 72/121; H04W 72/20; H04W 28/0278; H04W 72/23; H04W 84/22; H04W 88/04
See application file for complete search history.

(56) References Cited

U.S. PATENT DOCUMENTS

2015/0071212 A1 3/2015 Kim et al.
2016/0044707 A1* 2/2016 Folke ............... H04W 72/1268
370/329

(Continued)

FOREIGN PATENT DOCUMENTS

WO 2019007491 A1 1/2019

OTHER PUBLICATIONS

International Search Report and Written Opinion dated Feb. 4, 2020 for International Application No. PCT/EP2019/063140 filed May 21, 2019, consisting of 13-pages.
(Continued)

*Primary Examiner* — John D Blanton
(74) *Attorney, Agent, or Firm* — Weisberg I.P. Law, P.A.

(57) ABSTRACT

A method for enabling group transmission among devices capable of Device to Device, D2D, communication in network having a base station. The devices have a group coordinator may directly communicate with one another over a D2D link. The group coordinator device is arranged to communicate with the base station over a cellular link. The group coordinator device sends a Scheduling Request, SR, message requesting grants for both D2D and cellular transmission. The group coordinator device transmits a Buffer Status Report, BSR and receives a grant for said the D2D and the cellular transmissions based on the transmitted BSR. The group coordinator device distributes the received grant to the plurality of devices.

7 Claims, 6 Drawing Sheets

(51) Int. Cl.
*H04W 72/20* (2023.01)
*H04W 72/23* (2023.01)
*H04W 28/02* (2009.01)

(56) References Cited

U.S. PATENT DOCUMENTS

| | | | |
|---|---|---|---|
| 2017/0265227 A1* | 9/2017 | Wang | H04W 76/11 |
| 2018/0198465 A1 | 7/2018 | Ericson et al. | |
| 2018/0288740 A1* | 10/2018 | Ansari | H04W 16/10 |
| 2019/0208539 A1* | 7/2019 | Christoffersson | H04L 1/0045 |

OTHER PUBLICATIONS

Mårten Ericson et al.; UL Group Transmission Concept; D2D with simultaneous UL group transmission; Ericsson; Jun. 11, 2015, consisting of 31-pages.

W. Elmenreich et al.; Building blocks of cooperative relaying in wireless systems; University of Klagenfurt, Springer Journal 125; Oct. 2008, consisting of 2-pages.

ETSI TS 122 468 V12.1.0; LTE; Group Communication System Enablers for LTE (GCSE_LTE) (3GPP TS 22.468 version 12.1.0 Release 12), Oct. 2014, consisting of 22-pages.

ETSI TS 123 468 V12.5.0; LTE; Group Communication System Enablers for LTE (GCSE_LTE); Stage 2 (3GPP TS 23.468 version 12.5.0 Release 12), Jul. 2015, consisting of 32-pages.

3GPP TS 38.321 V15.4.0; 3rd Generation Partnership Project; Technical Specification Group Radio Access Network; NR; Medium Access Control (MAC) protocol specification (Release 15), Dec. 2018, consisting of 77-pages.

3GPP TS 36.321 V14.9.0; 3rd Generation Partnership Project; Technical Specification Group Radio Access Network; Evolved Universal Terrestrial Radio Access (E-UTRA); Medium Access Control (MAC) protocol specification (Release 14), Dec. 2018, consisting of 110-pages.

* cited by examiner

METHODS AND DEVICES FOR ENABLING GROUP TRANSMISSION IN COMMUNICATION NETWORKS

CROSS-REFERENCE TO RELATED APPLICATIONS

This application is a Submission Under 35 U.S.C. § 371 for U.S. National Stage Patent Application of International Application Number: PCT/EP2019/063140, filed May 21, 2019 entitled "METHODS AND DEVICES FOR ENABLING GROUP TRANSMISSION IN COMMUNICATION NETWORKS," the entirety of which is incorporated herein by reference.

TECHNICAL FIELD

The present disclosure is generally related to the telecommunication networks and more specifically to 2 hop transmission in Long Term Evolution, LTE, networks.

BACKGROUND

Device to Device, D2D, group communication may be a way to increase the uplink coverage and user bit rate for example in a future high frequency Fifth Generation, 5G, network. On a high level, a group of User Equipment, UEs, or sensors are D2D capable, and when a UE has data to transmit it will first distribute this data to neighbouring UEs in the group over the D2D or Side Link (SL). In a second step, the UEs in the group will cooperatively transmit the data over the cellular Up Link, UL. The cooperative transmission will increase the UL coverage, for example by combining several UEs, the total output power and may be beneficial from a latency point of view compared to repeated transmissions for coverage, as used for example in Long Term Evolution, LTE, narrowband. Such a D2D group communication may also be referred to as a 2-hop group transmission.

In such a 2-hop group transmission concept, when one UE in the group wants to transmit data through the group, it sends its data over the side link to the other users in the group. Thereafter in a 2nd hop, the data is sent in a synchronized manner from the UEs in the group over the cellular UL to the network node—evolved Node B, eNB, or a Next Generation Node B, GNB.

In the Down link, DL, the network transmits data to the group as if it was a single UE. At least one UE in the group must be able to receive the DL data. If necessary, the DL data is relayed to the other UEs in the group via D2D.

This is not an entirely new technique and is also known as cooperative relaying or Virtual Antenna Array. With the introduction of a group ID concept, there is no need for an extra radio chain. Furthermore, the UEs in the group are not required to have UL coverage; only one of the UEs in the group must have UL/DL cellular coverage.

There exists support for this to some extent in LTE Third Generation Partnership Project, 3GPP. It is, for example, possible to create groups of UEs transmitting to each other using Proximity based Services as described in 3GPP Rel. 12 LTE. Some information about how normal UL scheduling and resource assignment may be done in LTE and in Prose are described herein.

In 3GPP Technical Specification, TS, 38.321-f00, the Scheduling Request, SR, is used for requesting Uplink-Shared Channel, UL-SCH, resources for new transmission. The Medium Access Control, MAC, entity may be configured with zero, one, or more SR configurations. An SR configuration consists of a set of Physical Uplink Control Channel, PUCCH, resources for SR transmission across different Bandwidth Parts, BWPs, and cells. For a logical channel, at most one PUCCH resource for SR is configured per BWP.

Each SR configuration corresponds to one or more logical channels. Each logical channel may be mapped to zero or one SR configuration, which is configured by Radio Resource Control, RRC. The SR configuration of the Logical Channel, LCH, that triggers the Buffer Status Report, BSR, if such a configuration exists, is considered as corresponding SR configuration for the triggered SR. For BSR triggered by retxBSR-Timer expiry, the corresponding SR configuration for the triggered SR is that of the highest priority LCH that has data available for transmission at the time the BSR is triggered.

A typical scheduling procedure is illustrated in FIG. 2. In an unlicensed spectrum scenario, the UE or the gNB has to perform a channel sensing or Listen Before Talk, LBT, prior to any transmission in this procedure.

The Hybrid Automatic Repeat Request, HARQ, protocol is widely used in Fourth Generation, 4G, and 5G systems and will undoubtedly be used also in future systems to provide fast re-transmissions on the MAC layer. It is used both in UL and DL and can be configured in different ways, e.g. the maximum number of re-transmissions, operating BLER, when and how to retransmit etc. One way to implement the HARQ protocol is to use autonomous re-transmissions, i.e. the transmitter always performs a given number of HARQ retransmission attempts. Autonomous retransmissions are especially suitable in one-to-many or many-to-one communication scenarios since using HARQ feedback from many recipients or reliably transmitting HARQ feedback to many recipients is complicated. With suitable setting for the number of HARQ transmission attempts using autonomous re-transmissions, most of transmission errors can be recovered.

A UE employing Proximity based Service, ProSe, communication can operate in two modes for resource allocation: Scheduled resource allocation (mode 1) and UE autonomous resource selection (mode 2).

Mode 1: For scheduled resource allocation, the UE requests transmission resources from the eNB and the eNB schedules transmission resources for transmission of D2D control and data. For this mode, the UE needs to be RRC_CONNECTED in order to transmit data.

Mode 2: For UE autonomous resource selection, a UE on its own selects resources from resource pools to transmit D2D control and data.

If the UE is out of coverage, it can only use autonomous resource selection, i.e. Mode 2. If the UE is in coverage, it may use scheduled resource allocation or autonomous resource selection as per eNB configuration. When an exceptional case occurs, the UE is allowed to use UE autonomous resource selection temporarily even though it was configured to use scheduled resource allocation. RRC_IDLE UEs can only use autonomous resource selection.

From a transmitter perspective, the ProSe communication UE follows the below procedure for mode 1 communication as shown in FIG. 4.

Step 1: UE sends a scheduling request (D-SR or Random Access) to the eNB (same as legacy LTE procedure)

Step 2: UE receives resource grant from eNB (same as legacy LTE procedure)

Step 3: UE sends a ProSe BSR requesting resource for ProSe communication

Step 4: UE receives resource grant for ProSe communication (note that there is no dedicated contention resolution for D2D)

For mode 2 communication, the resource pools are provided by the system broadcast information and UE select the resources from the resource pool. The basic procedure can also be found in FIG. 4.

The procedure for the out-of-coverage case is given in FIG. 5. In this case, the resource pool configuration is obtained from pre-configuration and the UE will selection resource from the pre-configured resource pools and communicated with each other.

Buffer Status Report (BSR) MAC control elements consist of either:

Short BSR and Truncated BSR format: one LCG ID field and one corresponding Buffer Size field; or Long BSR format: four Buffer Size fields, corresponding to LCG IDs #0 through #3.

The BSR formats are identified by MAC PDU subheaders with LCIDs. The fields LCG ID and Buffer Size are defined as follow:

LCG ID: The Logical Channel Group ID field identifies the group of logical channel(s) which buffer status is being reported. The length of the field is 2 bits. For NB-IoT, the LCG ID is set to #0.

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits.

Side link BSR and Truncated Side link BSR MAC control elements consist of one Destination Index field, one LCG ID field and one corresponding Buffer Size field per reported target group.

The Side link BSR MAC control elements are identified by MAC PDU sub-headers with variable sizes. For each included group, the fields are defined as follows:

Destination Index: The Destination Index field identifies the ProSe Destination or the destination for V2X side link communication. The length of this field is 4 bits. The value is set to the index of the destination reported in destinationInfoList for side link communication or is set to one index among index(es) associated to same destination reported in v2x-DestinationInfoList for V2X side link communication. If multiple such lists are reported, the value is indexed sequentially across all the lists in the same order;

LCG ID: The Logical Channel Group ID field identifies the group of logical channel(s) which buffer status is being reported. The length of the field is 2 bits;

Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits.

R: Reserved bit, set to "0".

Buffer Sizes of LCGs are included in decreasing order of the highest priority of the sidelink logical channel belonging to the LCG irrespective of the value of the Destination Index field.

The major problem with the existing Prose (LTE D2D) concept is that it cannot support 2-hop group (cooperative) transmission. There are several missing components for this, but the major parts missing is how to create a group with cellular UL capabilities, how to handle the identities in the group and finally how to perform scheduling and prioritization of the 2-hop group transmission. This IvD deals with the problem of performing efficient dynamic scheduling for a 2-hop group transmission.

With the existing dynamic scheduling procedure as discussed in the background section, the coordinator device would request resources for D2D link and cellular link separately, and additional latency would be incurred for the group transmission. This issue is illustrated in FIG. 5.

An example of existing dynamic scheduling procedures is illustrated in FIG. 6. As shown in FIG. 6, for every packet of a UE in the group, the group coordinator needs to first send a scheduling request and D2D-BSR to the base station for requesting resources for D2D links in the group. Upon reception of the grants from the base station for D2D links, the data is transmitted in the group, so that every group member including the coordinator receives the data. Based on existing cellular BSR triggering conditions (e.g., arrival of new data in the logical channel group), a cellular BSR (such as LTE/NR BSR) would be triggered. Therefore, the group coordinator transmits a second scheduling request and BSR for the cellular link between the group and the base station. After reception of the second grant which is for the cellular links, the group members thereafter initiate transmissions towards the same base station at a specified time. It is obvious that additional latency for dynamic scheduling procedures would be added to each UP packet. For services with critical latency requirements, such additional latency may be not acceptable.

Therefore, it is necessary to study enhancements to dynamic scheduling to reduce the scheduling latency.

SUMMARY

In a first aspect of the present disclosure, there is presented a method for enabling group transmission in a telecommunication network comprising a plurality of devices capable of Device to Device, D2D, communication and comprising a base station, wherein said plurality of devices comprises a group coordinator device, wherein said plurality of devices may directly communicate with one another over a D2D side-link and wherein said group coordinator device is arranged to communicate with said base station over a cellular link, said method comprising the steps of sending, by said group coordinator device, to said base station, a Scheduling Request, SR, message requesting grants for both D2D and cellular transmission, receiving, by said group coordinator device, from said base station, a message requesting a Buffer Status Report, BSR, for said D2D and cellular transmissions, transmitting, by said group coordinator device, to said base station, said BSR, receiving, by said group coordinator device, from said base station, a grant for said D2D and said cellular transmissions based on said transmitted BSR, and distributing, by said group coordinator device, to said plurality of devices, said received grant thereby enabling group transmission for communication among said plurality of devices over said side-link and for communication between said plurality of devices and said base station over said cellular link.

The inventors considered it to be advantageous to combine the grants for both side link communication and the cellular communication. Such an enhanced dynamic scheduling procedure is proposed in order to handle a combined dynamic scheduling for D2D links and cellular links at the same time to reduce scheduling latency. Upon reception of a grant from the base station, the group coordinator device provides buffer status for both D2D links and cellular links in a single transmission.

The base station, for example a Fifth generation base station—gNB, scheduler assigns in a single signalling message such as Downlink Control Information, DCI, signalling, at least two grants at a time for the group. The first grant may be assigned for the D2D links, while the second grant may be assigned for cellular links.

According to an exemplary embodiment, the method, prior to said step of sending, further comprises the step of receiving, by said group coordinator device, from at least one of said plurality devices, an indicator arranged to indicate to said group coordinator device that grants for both said D2D and cellular transmissions are to be requested.

In the scheduling procedure, a group coordinator can trigger a combined BSR, including D2D BSR and cellular BSR, upon reception of a new data arrival indicator from a device. Whenever a device in the group has new data for the group transmission, that device triggers a signalling that is sent to the group coordinator. The signalling may be a new L1 signalling, such as similar to a Physical Uplink Control Channel—Scheduling Request, PUCCH-SR. Such a signal may also be referred to as a group SR within the context of the present disclosure.

The signalling may alternately be a L2/L3 signalling such as MAC CE or an RRC signalling, referred to as group scheduling information within the context of the present disclosure. Some corresponding signalling resources may be preconfigure/allocated to the device, so that the device can just send the signalling with those configured resources to the group coordinator when it is triggered.

For a group SR, it can be assigned/preconfigured to a device in time domain and frequency domain. The device may be assigned with periodic occasions. Upon reception of a group SR, the group coordinator device is able to identify which device to be scheduled based on from which resource the group SR has been transmitted/received. This group SR may also indicate the data volume so that the group coordinator device may build the D2D BSR accordingly.

For group scheduling info, the signalling may be transmitted using a pre-assigned small grant. Each device may have a dedicated small grant for transmission of group scheduling info message. The step of distributing may comprise, for example, broadcasting the received grant to all the devise in the group. Alternately, the received grant may be unicast to only certain devices in the group which are to be part of the group transmission.

According to an embodiment, the step of receiving said grant for said D2D and said cellular transmissions comprises receiving, by said group coordinator device, from said base station a D2D grant assigned for communication among said plurality of devices over said side-link, and receiving, by said group coordinator device, from said base station, a cellular grant assigned for communication between said plurality of devices and said base station over said cellular link.

According to an embodiment, the grants, i.e., the D2D grants and the cellular grants are separated in time.

According to a second aspect of the present disclosure, there is presented a method for enabling group transmission in a telecommunication network comprising a plurality of devices capable of Device to Device, D2D, communication and comprising a base station, wherein said plurality of devices comprises a group coordinator device, wherein said plurality of devices may directly communicate with one another over a D2D side-link and wherein said group coordinator device is arranged to communicate with said base station over a cellular link.

The method according to the second aspect of the disclosure comprises the steps of receiving, by said base station, from said group coordinator device, a Scheduling Request, SR, message requesting grants for both D2D and cellular transmission, sending, by said base station, to said group coordinator device, a message requesting a Buffer Status Report, BSR, for said D2D and cellular transmissions, receiving, by said base station, from said group coordinator device, said BSR, and transmitting, by said base station, to said group coordinator device, a grant for said D2D transmission and said cellular transmissions based on said received BSR thereby enabling group transmission for communication among said plurality of devices over said side-link and for communication between said plurality of devices and said base station over said cellular link.

It is noted that the advantages and definitions associated with the first aspect of the disclosure are also associated with the second aspect of the present disclosure.

According to an example, the step of transmitting said grant for said group transmission comprises transmitting, by said base station, to said group coordinator device, a D2D grant assigned for communication among said plurality of devices over said side-link, and transmitting, by said base station, to said group coordinator device, a cellular grant assigned for communication between said plurality of devices and said base station over said cellular link. The grants may be separated in time.

According to a third aspect of the present disclosure, there is presented a group coordinator device arranged for enabling group transmission in a telecommunication network comprising a plurality of devices capable of Device to Device, D2D, communication and comprising a base station, wherein said plurality of devices comprises said group coordinator device, wherein said plurality of devices may directly communicate with one another over a D2D side-link and wherein said group coordinator device is arranged to communicate with said base station over a cellular link.

The group coordinator device comprises transmit equipment arranged for sending, to said base station, a Scheduling Request, SR, message requesting grants for both D2D and cellular transmission, receive equipment arranged for receiving, from said base station, a message requesting a Buffer Status Report, BSR, for said D2D and cellular transmissions, said transmit equipment further arranged for transmitting, to said base station, said BSR, said receive equipment further arranged for receiving, from said base station, a grant for said D2D and said cellular transmissions based on said transmitted BSR, and said transmit equipment further arranged for distributing, to said plurality of devices, said received grant thereby enabling group transmission for communication among said plurality of devices over said side-link and for communication between said plurality of devices and said base station over said cellular link.

According to an embodiment, the receive equipment in the group coordinator device is further arranged for receiving, from at least one of said plurality devices, an indicator arranged to indicate to said group coordinator device that grants for both said D2D and cellular transmissions are to be requested.

According to an example, the grant for said group transmission comprises a D2D grant assigned for communication among said plurality of devices over said side-link, and a cellular grant assigned for communication between said plurality of devices and said base station over said cellular link.

According to an exemplary embodiment, the grants received by the group coordinator device are separated in time. It is noted that the benefits and advantages associated with the first and second aspects of the present disclosure are also associated with the third aspect of the present disclosure.

In a fourth aspect of the present disclosure, there is presented a base station arranged for enabling group transmission in a telecommunication network comprising a plurality of devices capable of Device to Device, D2D, communication and comprising said base station, wherein said plurality of devices comprises a group coordinator device, wherein said plurality of devices may directly communicate with one another over a D2D side-link and wherein said group coordinator device is arranged to communicate with said base station over a cellular link.

The base station comprises receive equipment arranged for receiving, from said group coordinator device, a Scheduling Request, SR, message requesting grants for both D2D and cellular transmission, transmit equipment arranged for sending, to said group coordinator device, a message requesting a Buffer Status Report, BSR, for said D2D and cellular transmissions, wherein said receive equipment further arranged for receiving, from said group coordinator device, said BSR, and wherein said transmit equipment further arranged for transmitting, to said group coordinator device, a grant for said D2D transmission and said cellular transmission based on said received BSR thereby enabling group transmission for communication among said plurality of devices over said side-link and for communication between said plurality of devices and said base station over said cellular link.

According to an embodiment of the fourth aspect of the present disclosure, the grant for said group transmission comprises a D2D grant assigned for communication among said plurality of devices over said side-link, and a cellular grant assigned for communication between said plurality of devices and said base station over said cellular link. In a further embodiment, the grant may be separated in time.

In a fifth aspect of the present disclosure, there is presented a computer readable storage medium comprising instructions which when loaded on to one or more nodes in a communication network is arranged for performing any of the methods embodiments as mentioned in the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
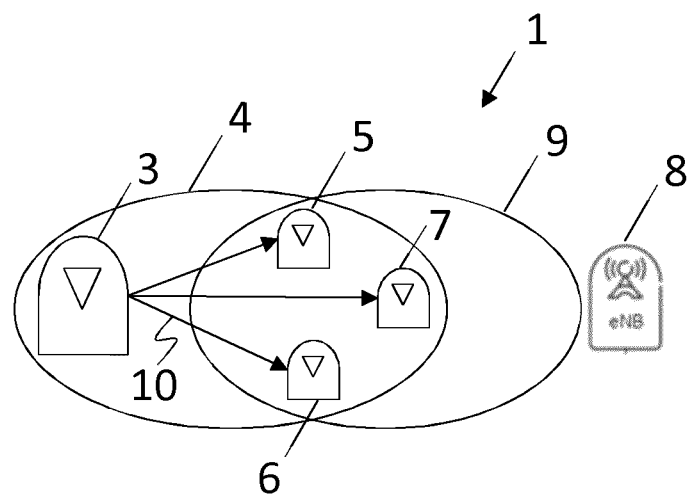
FIG. 1 schematically illustrates a communication network employing side link communication.

FIG. 1 schematically illustrates a communication network employing side link communication. Such a transmission involving both side link and Up/down link transmissions may also be referred to as a 2-hop transmission. A communication network 1 comprises a plurality of devices 3, 5, 6, 7. A group 4 may be formed by a device 3, wherein the group 4 comprises of devices 5, 6, 7 falling within the range of the device 3. Furthermore, the device 3 may not be in direct communication with a base station 8 having a coverage area 9, whereas other devices 5, 6, 7 etc. may fall within the range of base station 8.

Figure 2:
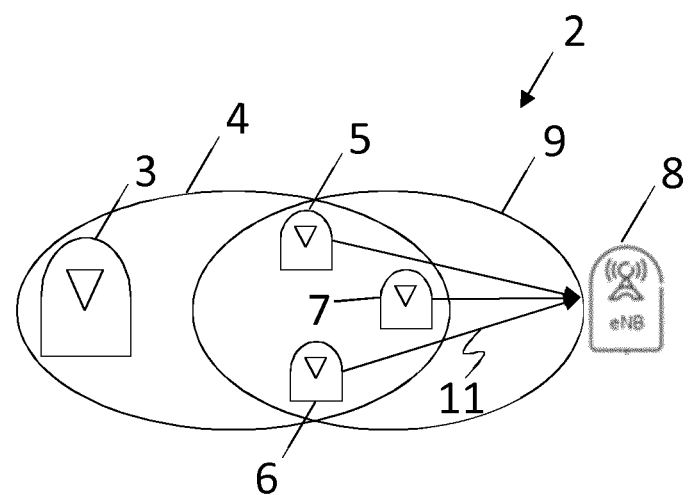
FIG. 2 schematically illustrates a communication network employing cooperative transmission.

When one device 3 in the group want to transmit data through the group, it sends 10 its data over the side link to the other devices in the group. The second hop of such a transmission system is illustrated in FIG. 2 by reference number 2. The data is sent 11 in a synchronized manner from the devices 5, 6, 7 in the group over the cellular up link to the base station 8. The skilled person understands that although FIGS. 1, and 2 illustrate the situation during an uplink process, a similar procedure may be adopted during downlink transmission. In the downlink, the base station 8 transmits data to the group 4 as if it was a single User Equipment, UE. At least one UE in the group must be able to receive the DL data. If necessary, the DL data is relayed to the other devices in the group via Device to Device, D2D.

Figure 3:
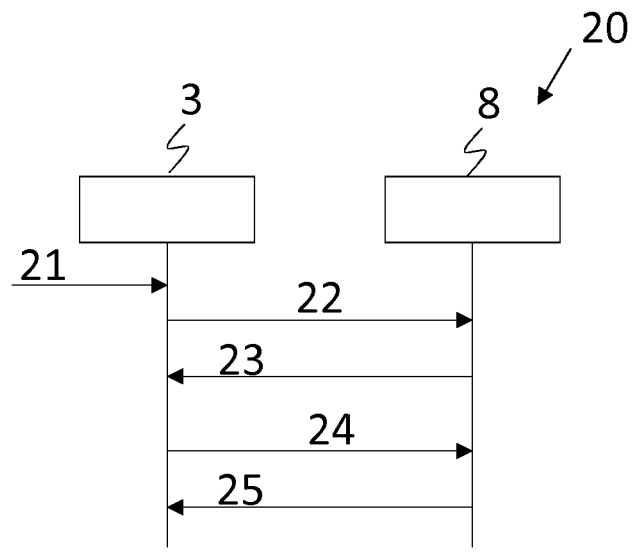
FIG. 3 schematically illustrates a typical dynamic scheduling procedure, according to the prior art.

FIG. 3 schematically illustrates a typical dynamic scheduling procedure 20, according to the prior art. When new data, that is to be transmitted, arrives 21 at a UE 3, a scheduling request 22 is sent to the base station 8. The base station 8 typically sends 23 a small grant that allows the UE 3 to provide the Buffer Status Report, BSR, to the base station 8. Based on the received grant 23, the UE 3 sends 24 the BSR and an indication of the amount of data to the base station 8. The base station 8, then provides 25 a grant for the rest of the data.

Figure 4:
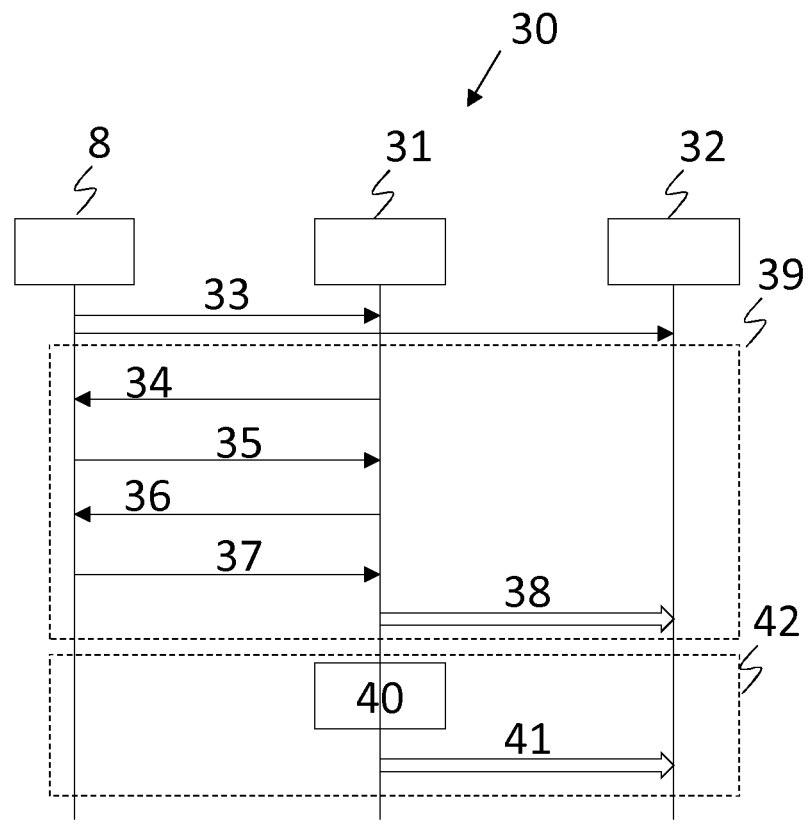
FIG. 4 schematically illustrates a Device to Device, D2D communication procedure for a device that is within coverage of a base station.

FIG. 4 schematically illustrates a Device to Device, D2D communication procedure 30 for a device that is within coverage of a base station. The procedure 30 illustrates two possible modes, 39 and 42, of operation. For ease of reference, they may be referred to as Mode 1, 39 and Mode 2, 42 respectively. In a first step of configuration, 33, the base station 8 configures the various devices 31, 32 within the communication network and provides an indication of the available resources. In mode 1 communication, the transmitter sends 34 a scheduling Request, SR, to the base station 8. Subsequently, the transmitter 31 receives 35 a resource grant from the base station 8.

A second request, specifically a ProSe BSR, requesting resource for ProSe communication is sent 36. When a corresponding grant 37 is received, the transmitter 31 can proceed with D2D communication 38 the remaining devices in the group. It may be noted here that there is no dedicated contention resolution for D2D. For mode 2 communication 42, the resource pools are provided by the system broadcast information in step 33, and the transmitter 31 selects 40 the resources from the resource pool and subsequently performs 41 the D2D communication.

Figure 5:
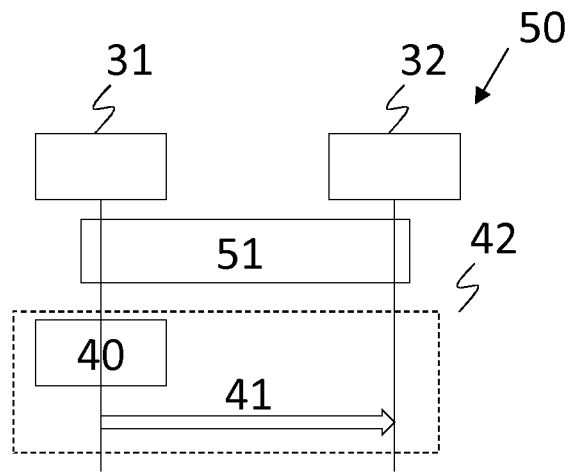
FIG. 5 schematically illustrates a D2D communication procedure for a device that is outside coverage of a base station.

FIG. 5 schematically illustrates a D2D communication procedure 50 for a device that is outside coverage of a base station. In this case, the resource pool configuration is obtained from a pre-configuration 51 and the device 31 will select resources 40 from the pre-configured resource pools and perform the D2D communication 41.

Figure 6:
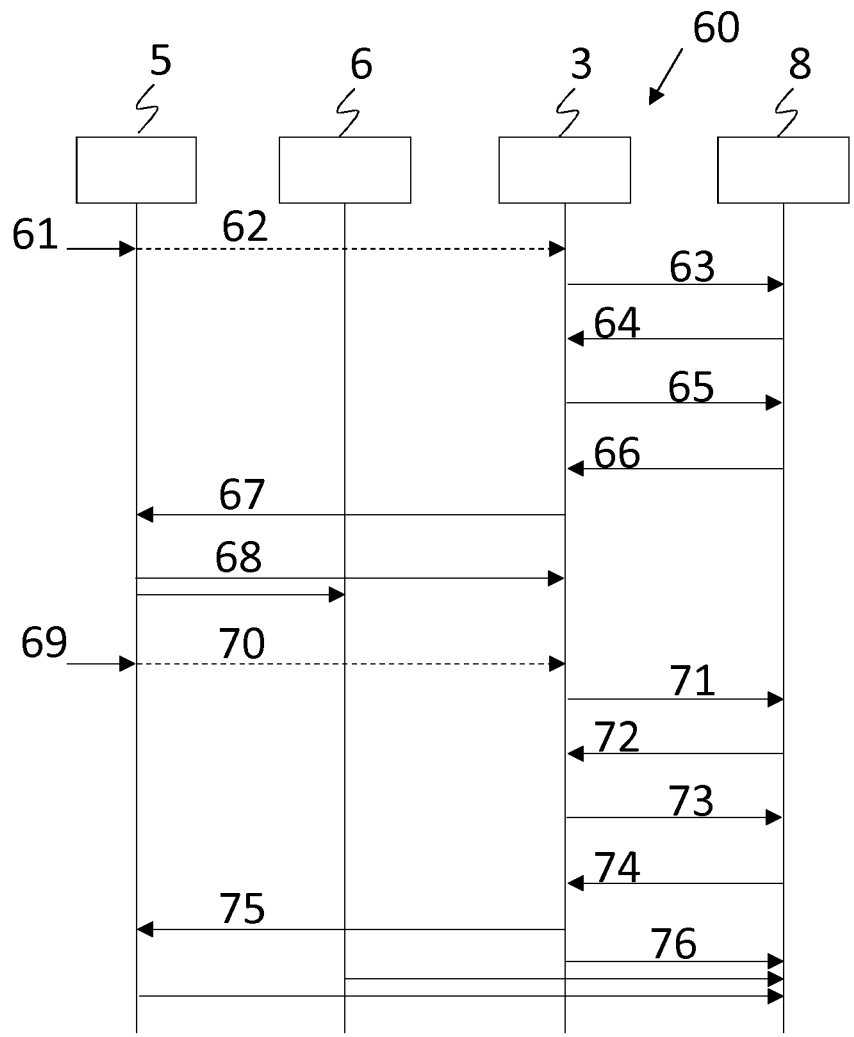
FIG. 6 schematically illustrates an example of an existing dynamic scheduling procedure for D2D and cellular links.

FIG. 6 schematically illustrates an example of an existing dynamic scheduling procedure 60 for D2D and cellular links. As shown in FIG. 6, for every packet of a device 5, 6, in the group, the group coordinator device 3, needs to first send a scheduling request 63 and D2D BSR 65 to the base station 8 for requesting resources for D2D links in the group. Upon reception of grants 64, 66 from the base station 8 for D2D links, the data is transmitted 68 in the group, so that every member in the group including the coordinator device receives the data.

The whole procedure 60 may be initiated upon the arrival of corresponding dataset. For example, a D2D communication may be initiated upon arrival 61 of new data at device 5 for D2D links which may in turn result in device 5 sending an SR 62. Correspondingly, a cellular communication may be initiated upon arrival 69 of new data at device 5 for cellular links which may in turn result in device 5 sending an SR 70.

Based on existing cellular BSR triggering condition, for example arrival 69 of new data in the logical channel group, a cellular BSR such as LTE/NR BSR would be triggered. Therefore the group coordinator 3 transmits a second scheduling request 71 and BSR 73 for the cellular link between the group and the base station 8. After reception of the second grant 74, which is for cellular links, the group members, 5, 6 thereafter initiate transmissions 76 towards the same base station 8 at a specified time. It is obvious that additional latency for dynamic scheduling procedures would be added to each UP packet. For services with critical latency requirements, such additional latency may not be acceptable.

Figure 7:
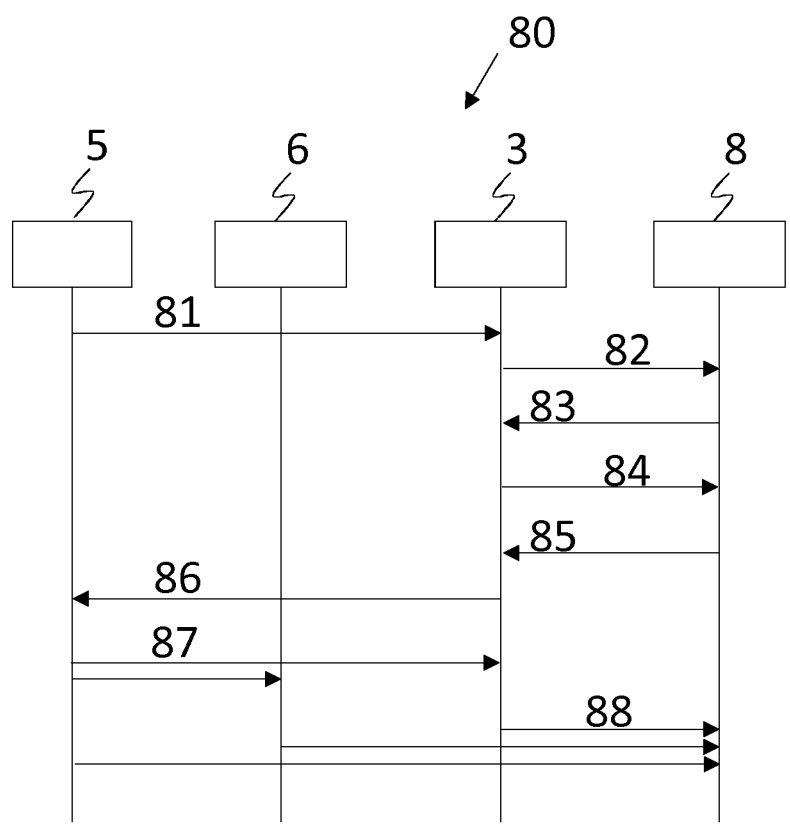
FIG. 7 schematically illustrates a method of a dynamic scheduling procedure for D2D and cellular links according to the present disclosure.

FIG. 7 schematically illustrates a method of a dynamic scheduling procedure 80 for D2D and cellular links according to the present disclosure. The enhanced dynamic scheduling procedure 80 for D2D group links and cellular links include three broad steps as described below.

Step 1: A specific group SR resource is configured for the coordinator UE 3 and is sent 82 towards the base station 8. This group SR is used to indicate to the Base station 8 that there is new data arrival in the group and requesting grants for both the side link (D2D) and the cellular transmission.

Step 2: upon reception of this specified group SR, the base station 8 assigns a grant 83 to the group coordinator 3 which is enough for carrying both a D2D BSR and a cellular BSR. The D2D BSR is built by the coordinator 3 based on the specific group SR above. The D2D BSR is intended to request resources for the D2D links. The cellular BSR is intended to request resources for the cellular links. The group coordinator sends 84 both BSRs to the base station in a single transmission. As another option, D2D BSR and cellular BSR can be combined into one single BSR MAC CE which can be a new format comprising link indicators (either cellular link or D2D link). This is feasible since the gNB knows which nodes are transmitters and receivers for both the D2D links and the cellular links. Therefore, it is sufficient to send the same buffer status with one BSR MAC CE for both links.

Step 3: The base station schedules 85 at least one grant for the D2D links and one grant for the cellular links. Both grants are separated in the time domain. The steps are illustrated in FIG. 7. Based on the received grants, the grant information is broadcast 86 by the group coordinator 3 to other devices 5, 6 in the group. Subsequently, the devices 5, 6 in the group may carry out D2D communication 87 or cellular communication 88.

Figure 8:
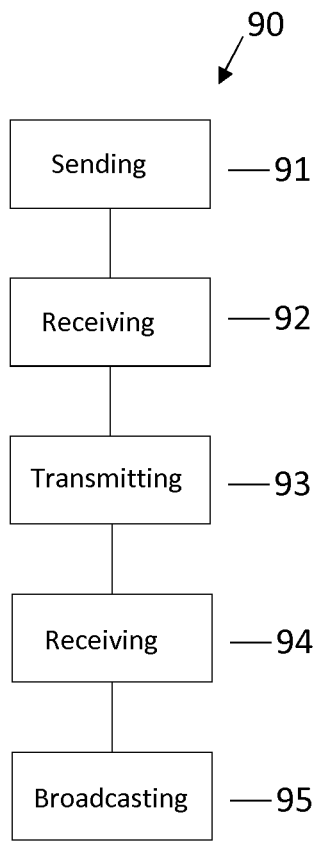
FIG. 8 schematically illustrates a method according to the present disclosure.

FIG. 8 schematically illustrates a method 90 according to the present disclosure. The method 90 comprises the steps of sending 91, by the group coordinator device, to the base station, a Scheduling Request, SR, message requesting grants for both D2D and cellular transmission. In response, it receives 92, from said base station, a message requesting a Buffer Status Report, BSR, for said D2D and cellular transmissions. In a further step 93, the group coordinator device transmits, to said base station, said BSR.

In the step of receiving 94, the group coordinator device receives, from said base station, a grant for said D2D and said cellular transmissions based on said transmitted BSR. In a further step of broadcasting 95, the group coordinator device broadcasts, to said plurality of devices, said received grant thereby enabling group transmission for communication among said plurality of devices over said side-link and for communication between said plurality of devices and said base station over said cellular link.

Figure 9:
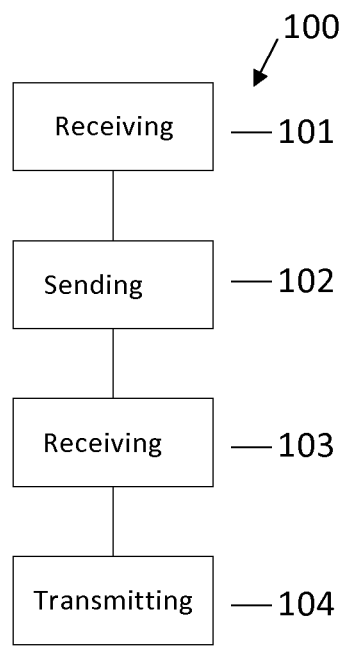
FIG. 9 schematically illustrates a method according to the present disclosure.

FIG. 9 schematically illustrates a method 100 according to the present disclosure. The method comprises the steps of receiving 101, by said base station, from said group coordinator device, a Scheduling Request, SR, message requesting grants for both D2D and cellular transmission. In a subsequent step of sending 102, the base station sends, to said group coordinator device, a message requesting a Buffer Status Report, BSR, for said D2D and cellular transmissions.

In a step of receiving 103, the base station receives, from said group coordinator device, said BSR, and subsequently transmits 104, to said group coordinator device, a grant for said D2D transmission and said cellular transmissions based on said received BSR thereby enabling group transmission for communication among said plurality of devices over said side-link and for communication between said plurality of devices and said base station over said cellular link.

Figure 10:
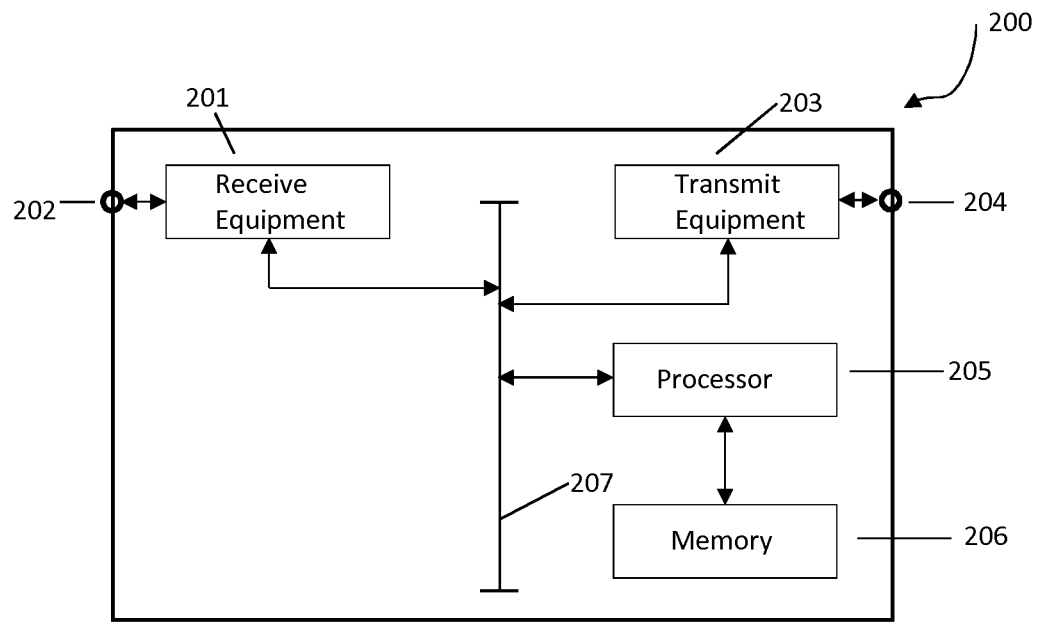
FIG. 10 schematically illustrates a group coordinator device according to the present disclosure.

FIG. 10 schematically illustrates a group coordinator device 200 according to the present disclosure. The group coordinator device 200 is arranged for enabling group transmission in a telecommunication network comprising a plurality of devices capable of Device to Device, D2D, communication and comprising a base station, wherein said plurality of devices comprises said group coordinator device, wherein said plurality of devices may directly communicate with one another over a D2D side-link and wherein said group coordinator device is arranged to communicate with said base station over a cellular link.

The group coordinator device 200 comprises transmit equipment 203, 204 arranged for sending, to said base station, a Scheduling Request, SR, message requesting grants for both D2D and cellular transmission. The group coordinator device 200 also comprises receive equipment 201, 202 arranged for receiving, from said base station, a message requesting a Buffer Status Report, BSR, for said D2D and cellular transmissions.

The transmit equipment 203, 204 is further arranged for transmitting, to said base station, said BSR and the receive equipment 201, 202 is further arranged for receiving, from said base station, a grant for said D2D and said cellular transmissions based on said transmitted BSR. The transmit equipment 203, 204 is further arranged for broadcasting, to said plurality of devices, said received grant thereby enabling group transmission for communication among said plurality of devices over said side-link and for communication between said plurality of devices and said base station over said cellular link.

The device also comprises of a processor 205 which, among others, is also arranged to execute instruction in the form of a computer program loaded onto the memory 206. The execution of the computer program by the processor 205 causes the group coordinator device 200 to perform a method as disclosed in the present disclosure.

Figure 11:
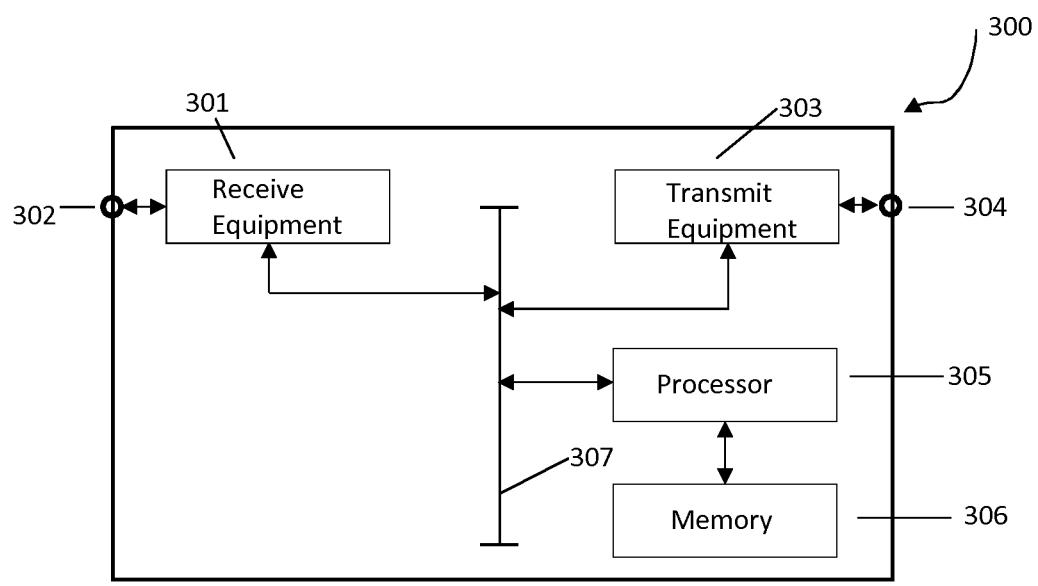
FIG. 11 schematically illustrates a base station according to the present disclosure.

FIG. 11 schematically illustrates a base station 300 according to the present disclosure. The base station 300 is arranged for enabling group transmission in a telecommunication network comprising a plurality of devices capable of Device to Device, D2D, communication and comprising said base station, wherein said plurality of devices comprises a group coordinator device, wherein said plurality of devices may directly communicate with one another over a D2D side-link and wherein said group coordinator device is arranged to communicate with said base station over a cellular link.

The base station 300 comprises receive equipment 301, 302 arranged for receiving, from said group coordinator device, a Scheduling Request, SR, message requesting grants for both D2D and cellular transmission. The transmit equipment 303, 304 is arranged for sending, to said group coordinator device, a message requesting a Buffer Status Report, BSR, for said D2D and cellular transmissions. The receive equipment 301, 302 is further arranged for receiving, from said group coordinator device, said BSR, and the transmit equipment 303, 304 is further arranged for transmitting, to said group coordinator device, a grant for said D2D transmission and said cellular transmission based on said received BSR thereby enabling group transmission for communication among said plurality of devices over said side-link and for communication between said plurality of devices and said base station over said cellular link.

The base station 300 also comprises of a processor 305 which, among others, is also arranged to execute instruction in the form of a computer program loaded onto the memory 306. The execution of the computer program by the processor 305 causes the base station 300 to perform a method as disclosed in the present disclosure.

Within the scope of the present disclosure, the term "device" may refer to User Equipment, or any other device capable of communicating using a side link. Particularly the term may refer to sensors or array of sensors such as found in an Internet of Things, IoT, network.

Other variations to the disclosed examples can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms, such as via the internet or wired or wireless telecommunication systems. Any reference signs in the claims should not be construed as limiting the scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for enabling two-hop group transmission in a telecommunication network comprising a plurality of devices capable of Device to Device, D2D, communication and comprising a base station, the plurality of devices having a group coordinator device, the plurality of devices being configured to directly communicate with one another over a D2D link and the group coordinator device is arranged to communicate with the base station over a cellular link, the method comprising:
   receiving, by the group coordinator device, from at least one of the plurality devices, an indicator arranged to indicate to the group coordinator device that grants for both the D2D and cellular transmissions are to be requested;
   after the receiving of the indicator, sending, by the group coordinator device, to the base station, a Scheduling Request, SR, message requesting grants for BSRs for both D2D and group cellular transmission;
   receiving, by the group coordinator device, from the base station, a grant for a Buffer Status Report, BSR, for the D2D and cellular transmissions;
   transmitting, by the group coordinator device, to the base station, the BSR;
   receiving, by the group coordinator device, from the base station, a grant for data transmission for said D2D and the cellular transmissions based on the transmitted BSR; and
   distributing, by the group coordinator device, to the plurality of devices, the received grant thereby enabling group transmission for communication among the plurality of devices over the D2D link and for communication between the plurality of devices and the base station over the cellular link.

2. The method according to claim 1, wherein the receiving the grant for the D2D and the cellular transmissions comprises:
   receiving, by the group coordinator device, from the base station a D2D grant assigned for communication among the plurality of devices over the D2D link; and receiving, by the group coordinator device, from the base station, a cellular grant assigned for communication between the plurality of devices and the base station over the cellular link.

3. The method according to claim 2, wherein the grants are separated in time.

4. A group coordinator device arranged for enabling group transmission in a telecommunication network comprising a plurality of devices capable of Device to Device, D2D, communication and comprising a base station, the plurality of devices having a group coordinator device, the plurality of devices configured to directly communicate with one another over a D2D link and the group coordinator device is arranged to communicate with said base station over a cellular link, the group coordinator device comprising:
  transmit equipment configured to send, to the base station, a Scheduling Request, SR, message requesting grants for both D2D and cellular transmission;
  receive equipment configured to receive, from the base station, a message requesting a Buffer Status Report, BSR, for the D2D and cellular transmissions;
  the transmit equipment being further configured to transmit, to the base station, the BSR;
  the receive equipment being further configured to receive, from the base station, a grant for the D2D and the cellular transmissions based on the transmitted BSR;
  the receive equipment being further configured to receive, from at least one of the plurality devices, an indicator arranged to indicate to the group coordinator device that grants for both the D2D and cellular transmissions are to be requested; and
  the transmit equipment further configured to distribute, to the plurality of devices, the received grant thereby enabling group transmission for communication among the plurality of devices over the D2D link and for communication between the plurality of devices and the base station over the cellular link.

5. The group coordinator device according to claim 4, wherein the grant for the group transmission comprises:
  a D2D grant assigned for communication among the plurality of devices over the D2D link; and
  a cellular grant assigned for communication between the plurality of devices and the base station over the cellular link.

6. The group coordinator device according to claim 5, wherein the grants are separated in time.

7. A non-transitory computer readable storage medium comprising instructions which when executed by at least one node in a communication network causes the node to perform a method comprising:
  receiving an indicator arranged to indicate that grants for both D2D and cellular transmissions are to be requested;
  after the receiving of the indicator, sending a Scheduling Request, SR, message requesting grants for BSRs for both D2D and group cellular transmission;
  receiving a grant for a Buffer Status Report, BSR, for the D2D and cellular transmissions;
  transmitting the BSR;
  receiving, a grant for data transmission for the D2D and the cellular transmissions based on the transmitted BSR; and
  distributing to a plurality of devices, the received grant thereby enabling group transmission for communication among the plurality of devices over the D2D link and for communication between the plurality of devices and a base station over the cellular link.

* * * * *